United States Patent [19]

Ezaki et al.

[11] Patent Number: 4,803,577
[45] Date of Patent: Feb. 7, 1988

[54] VERTICAL MAGNETIC RECORDING SYSTEM USING RIGID DISK

[75] Inventors: Joichiro Ezaki; Kazumasa Fukuda, both of Nagano, Japan

[73] Assignee: TDK Corporation, Tokyo, Japan

[21] Appl. No.: 872,240

[22] Filed: Jun. 9, 1986

[30] Foreign Application Priority Data

Jun. 12, 1985 [JP] Japan .................... 60-128874
Jun. 12, 1985 [JP] Japan .................... 60-128875

[51] Int. Cl.⁴ .................... G11B 5/60; G11B 15/64; G11B 17/32; G11B 21/20
[52] U.S. Cl. .................... 360/102; 360/135
[58] Field of Search .............. 360/102, 103, 135, 104, 360/105, 128, 129, 97–99; 428/694, 695, 900

[56] References Cited

U.S. PATENT DOCUMENTS

| | | | |
|---|---|---|---|
| 4,327,387 | 4/1982 | Plotto | 360/103 |
| 4,590,119 | 5/1986 | Kauakami et al. | 360/135 |
| 4,619,856 | 10/1986 | Kamada et al. | 360/135 |
| 4,633,351 | 12/1986 | Bardos et al. | 360/102 |

FOREIGN PATENT DOCUMENTS

| | | | |
|---|---|---|---|
| 0180651 | 5/1986 | European Pat. Off. | 360/135 |
| 0090427 | 7/1981 | Japan | 360/137 |
| 0082626 | 5/1984 | Japan | 360/135 |

Primary Examiner—Stuart N. Hecker
Assistant Examiner—David J. Severin
Attorney, Agent, or Firm—Martin M. Novack

[57] ABSTRACT

A vertical recording system using a rigid disk medium with high recording density has a substrate made of alumina silicate resin glass and a vertical magnetic anisotropic film located on said substrate. The anisotropic film has an easy axis of magnetization in the thickness direction of the film, and the hard axis of magnetization in the film plane. The maximum surface roughness $R_{max}$ of said disk is less than 50 Å, and a magnetic recording head which moves relative to the medium operates with said head contacted with the medium. A recording density higher than 200 KFRPI (kilo flux reversal per inch) is obtained by the present invention.

3 Claims, 4 Drawing Sheets

VERTICAL MAGNETIC RECORDING SYSTEM USING RIGID DISK

BACKGROUND OF THE INVENTION

The present invention relates to a magnetic recording system using a rigid disk and, in particular, relates to a vertical magnetic recording system with high recording density.

As a disk type magnetic recording medium, there have been known not only a floppy disk using a flexible sheet made of polyester film, but also a rigid disk using a rigid (not flexible) substrate made of aluminium. A rigid disk is better than a flexible disk in high speed operation of a recording medium, and high density recording.

Conventionally, a longitudinal recording system in which magnetization is in the plane of a film has been used, together with a flying head. However, a longitudinal recording system has the disadvantage that the resolution or the recording density is not so high because of the presence of demagnetization even when the gap length of a head is sufficiently small, and the flying height of the head is sufficiently low.

On the other hand, a vertical recording system in which magnetization is generated in the thickness direction does not suffer from the demagnetization, therefore, the vertical recording system is promising for high density recording. In a vertical recording system, a magnetic anisotropic film which has easy axis of magnetization in the thickness direction, and the hard axis of magnetization in the film plane is used as a recording medium.

FIG. 1 shows curves between the flying height $h_1$ of the magnetic head from the surface of the medium, and the recording density $D_{50}$ (kilo FRPI; kilo flux reversal per inch). The curve $L_1$ shows the characteristics of a longitudinal recording rigid disk, and the curve $L_2$ shows the characteristics of a vertical magnetic rigid disk. The density $D_{50}$ means the recording density at which the reproduced output level is 50% as compared with the level in a sufficiently low recording density. The unit FRPI (flux reversal per inch) means the number of magnetizations in an inch.

As shown in FIG. 1, the recording density of a longitudinal recording medium saturates when the height of a head is lower than 0.2 micron. On the other hand, the recording density $D_{50}$ of a vertical recording medium increases exponentially as the flying height of a head is lowered. In particular, a vertical recording medium is superior to a longitudinal recording medium when the height of a head is lower than 0.2 micron ($\mu$m). The vertical recording medium has the maximum recording density when $h_1=0$, that is to say, when a head contacts with a recording medium.

However, a prior recording medium has the disadvantage that when a head contacts with a recording medium, friction between a head and a recording medium in the relative movement of the head and the medium causes head crash, and both the head and the recording medium are destroyed within a short time. That is the reason why a flying head has been used in a conventional longitudinal recording system. In order to avoid head crash, the flying height in a prior art is larger than 3000 Å.

SUMMARY OF THE INVENTION

It is an object, therefore, of the present invention to overcome the disadvantages and limitations of a prior magnetic recording system by providing a new and improved magnetic recording system.

It is also an object of the present invention to provide a magnetic recording system which has high resolution or high recording density, and is free from head crash even when a head contacts directly with a recording medium.

The above and other objects are attained by a vertical recording system in which a rigid disk medium comprises a rigid substrate made of ceramics, a vertical magnetic anisotropic film located on said substrate, and wherein the maximum surface roughness $R_{max}$ of the disk is less than 50 Å is used, and a head contacts directly with said medium.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The main elements which restrict recording density in a rigid disk are gap length of a head, demagnetization of recording medium which depends mainly upon thickness of magnetic film, and flying height of a head. In a conventional longitudinal recording system, those three elements have similar weights. Among them, a gap length of a head can be small enough to provide higher recording density. In a vertical recording system, demagnetization does not restrict the recording density. Therefore, the only one element which restricts the recording density is the flying height of a head. Therefore, our effort is concentrated to reduce the flying height, or to contact a head with a medium in a rigid disk which rotates with high speed.

We found in our research that the durability or the life time of a vertical recording rigid disk which moves relative to a recording/reproducing head with the head contacted with the medium depends considerably upon the nature of the surface of the recording medium. In particular, we found that the life time depends upon the surface roughness of the medium, and a substrate or a support of the medium.

We carried out an experiment in which we produced some recording media having various surface roughness. The maximum surface roughness is defined by the maximum difference $R_{max}$ between the highest point and the lowest point in a predetermined area on the surface of the recording medium. We used the Talystep manufactured by Rank Taylor Hobson Co., in Great Britain for measuring the surface roughness. The Talystep measures the surface roughness by scanning the surface with a stylus.

Figure 2:
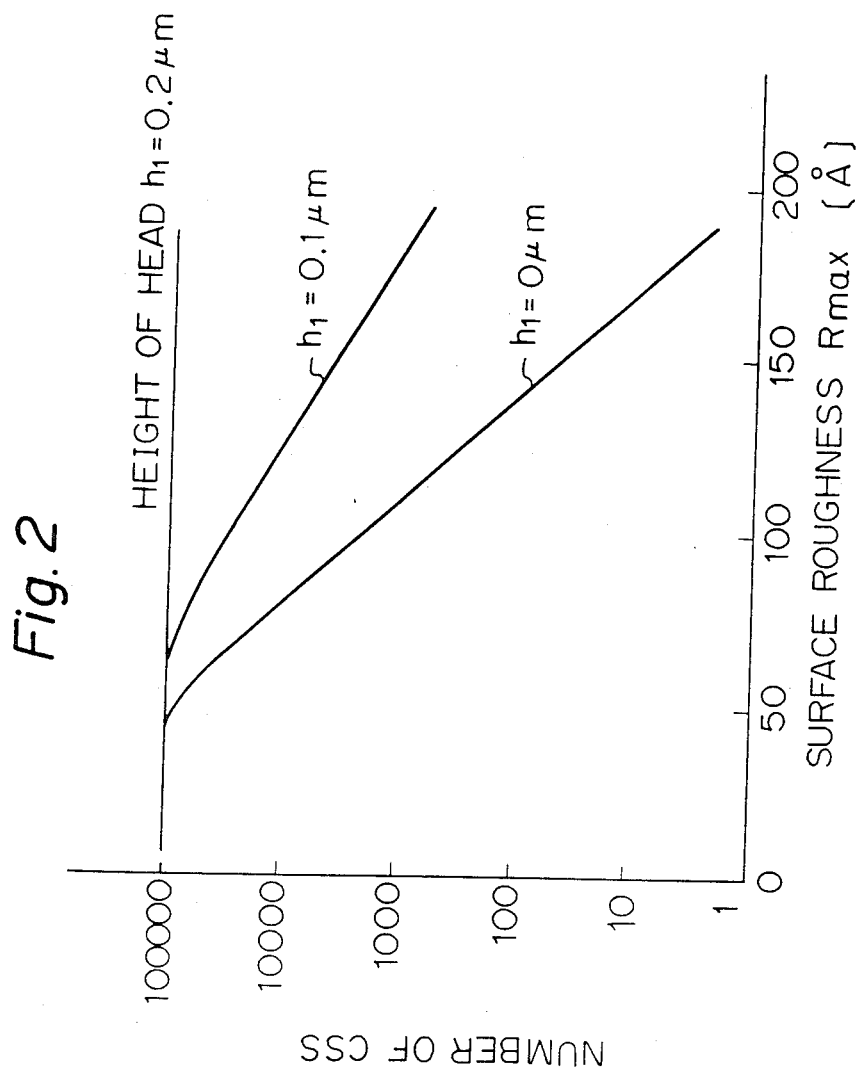
FIG. 2 shows curves between surface roughness of a recording medium and durability of a vertical recording rigid disk.

FIG. 2 shows the experimental results between the surface roughness or the surface coarseness of a recording medium and the number of CSS tests (contact start stop times) until a head crash is observed. Each CSS test has the step of moving a medium with the head contacted with the medium until the speed reaches the operating speed, and stopping the medium. The test was repeated 100,000 times with the parameter of a head height $h_1=0$, $h_1=0.1$ μm, and $h_1=0.2$ μm.

We found in the experiment that when $h_1=0.2$ μm, the head crash does not occur if the surface roughness $R_{max}$ is 200 Å. However, when the height $h_1$ is less than 0.1 μm, the head crash happens even when the maximum surface roughness $R_{max}$ is around 100 Å in 20,000 times of CSS tests. Of course the durability in that case is not satisfactory.

Our experiment further revealed that when the maximum surface roughness $R_{max}$ is less than 50 Å, no head crash happens even when $h_1=0$, that is to say, when a head contacts directly with a recording medium.

The contact pressure between the head and the recording medium is preferably less than 10 grams and still preferably is between 8 grams and 10 grams, when the head contacts with the medium.

Figure 1:
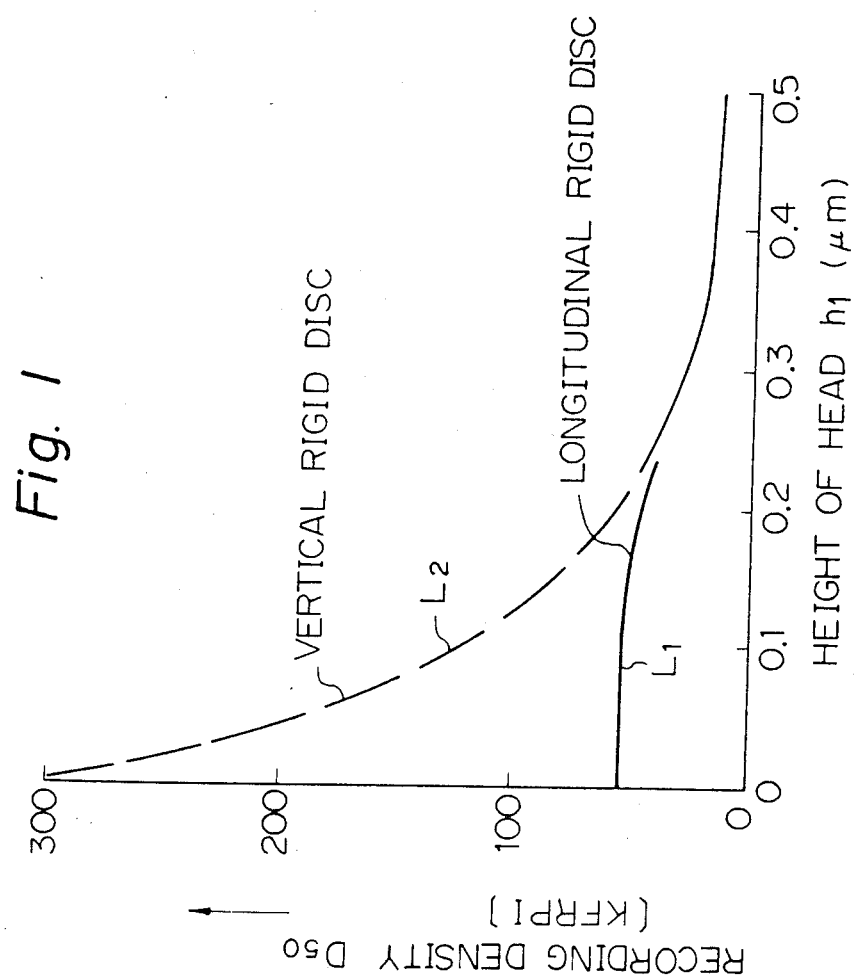
FIG. 1 shows curves between height of a flying head and recording density.

It should be appreciated in FIGS. 1 and 2 that when the height $h_1$ of a head is 0, and the maximum surface roughness $R_{max}$ is less than 50 Å, the durability of both a head and a recording medium is satisfactory (CSS times is larger than 100,000), and the high recording density in a vertical recording rigid disk is obtained.

Figure 3:
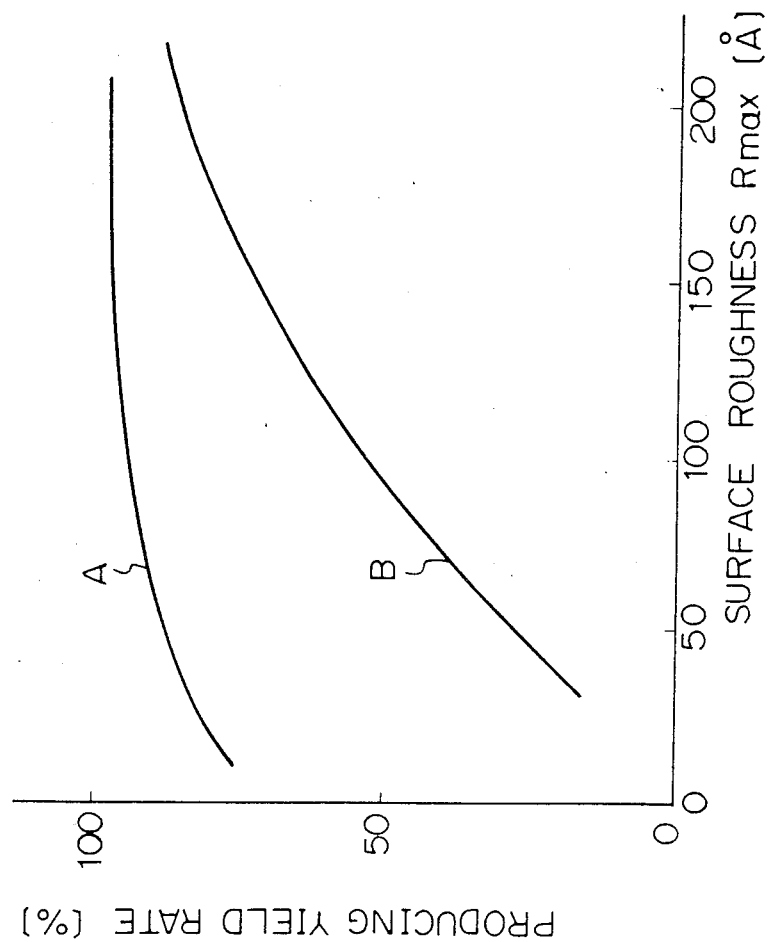
FIG. 3 shows curves between surface roughness and manufacturing yield rate for two substrates.

We further carried out another experiment in which we tested the substrate of a magnetic disk for providing a smooth surface. FIG. 3 shows curves of our experiment between the surface roughness, and the manufacturing yield rate in the polishing process of a substrate. The test was carried out for a prior substrate, aluminium, and for a substrate made of alumina silicate resin glass. In FIG. 3, the horizontal axis shows the surface roughness $R_{max}$, the vertical axis shows the manufacturing yield rate in the polishing process, the curve A shows the case of ceramics of alumina silicate resin glass, and the curve B shows the case of a prior aluminium substrate. As shown in FIG. 3, when the surface roughness $R_{max}$ is less than 50 Å the manufacturing yield rate in case of aluminium substrate is only 20–30%. On the other hand, when a substrate is made of alumina silicate resin glass, the manufacturing yield rate is higher than 80% even when the surface roughness $M_{max}$ is less than 50 Å. Accordingly, it is clear that alumina silicate resin glass is preferable as a substrate of a vertical recording rigid disk. Generally, a ceramics substrate is preferable to a metal substrate as a smooth substrate for a vertical recording medium.

Figure 4:
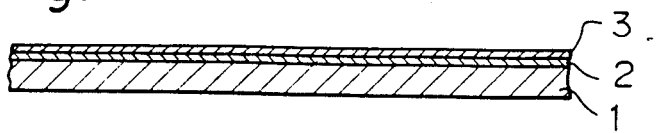
FIG. 4 and FIG. 5 show cross sections of structures of vertical recording rigid disk medium according to the present invention.
Figure 5:
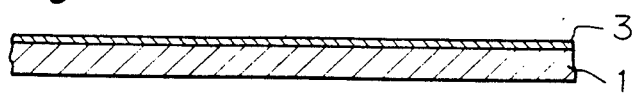

FIGS. 4 and 5 show embodiments of a cross section of the present rigid disk. In the embodiment of FIG. 4, the reference numeral 1 is a rigid substrate made of ceramics. Alumina silicate resin glass is an embodiment of that ceramics. The numeral 2 is a magnetic layer having high permeability located on said substrate 1 either directly or through a foundation layer. The numeral 3 is a vertical anisotropic layer located on said magnetic layer 2 either directly or through an intermediate layer. In the embodiment of FIG. 5, the magnetic layer 2 of FIG. 4 is omitted, and the vertical anisotropic layer 3 is located on the substrate 1 either directly or through a foundation layer. In each of the embodiments, a protection layer may be located on the vertical anisotropic layer 3. An example of a magnetic layer 2 is Ni-Fe-Mo series supermalloy or Ni-Fe series permalloy, and an example of vertical anisotropic film 3 is Co-Cr (Cobalt-Chromium) alloy provided through a sputtering process.

The magnetic anisotropic film is attached through a sputtering process, or evaporation process so that proper anisotropic characteristics in which the easy axis of magnetization is in the thickness direction, and the hard axis of magnetization is in the film plane.

Figure 6:
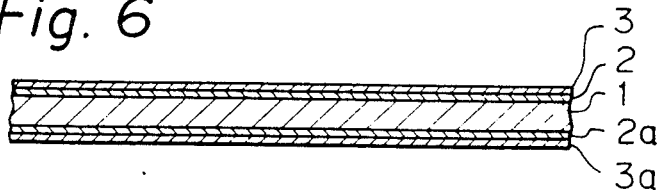
FIG. 6 and FIG. 7 show cross sections of other structures of vertical recording rigid disk medium according to the present invention.
Figure 7:
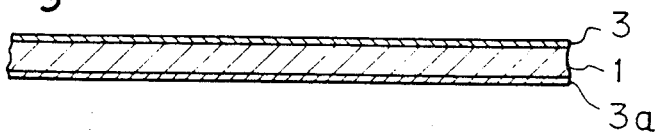

FIGS. 6 and 7 show modifications of the present invention. In FIG. 6, supermalloy layers 2 and 2a are attached on both surfaces of the substrate 1, and a pair of vertical anisotropic films 3 and 3a are attached on both the surfaces. In FIG. 7, a pair of vertical anisotropic films 3 and 3a are attached on both the surfaces of the substrate 1.

Figure 8:
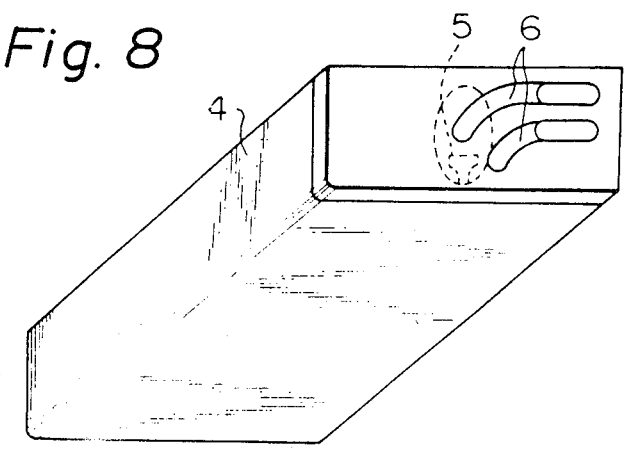
FIG. 8 shows a head used in the present invention.

FIG. 8 shows a structure of a head which is used in the present invention, in which a head operates with the head contacted with the recording medium. In FIG. 8, the numeral 4 is a slider made of ceramics, 5 is a thin film head provided on one plane of the slider, and 6 is lead wires for coupling the head with an external circuit. Other structure which includes a monolithic head which has a slider as a part of the head is also possible to use in the present invention.

The structure of a head may be conventional one having a gap space in a C-ring structure.

As mentioned above in detail, according to the present invention, a magnetic recording disk with alumina silicate resin glass having a vertical magnetic anisotropic film with the maximum surface roughness $M_{max}$ less than 50 Å has been discovered. That medium has excellent durability or life time even when a magnetic head operates with the head contacted with the medium, and no head crash occurs. Therefore, a vertical recording system which is capable of high recording density and high resolution higher than 200 KFRPI is obtained.

From the foregoing it will now be apparent that a new and improved magnetic recording system has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. A system for recording and reproducing information on a magnetic recording medium by using a magnetic head through relative movement between the head and the recording medium comprising a recording disk having a rigid disk substrate made of alumina silicate resin glass, and a vertical magnetic anisotropic film coupled with said substrate, the maximum surface roughness $R_{max}$ of said disk being less than 50 Å and the spacing between said head and said disk in operation being less than 0.1 micron.

2. A system for recording and reproducing information according to claim 1, wherein said spacing is zero.

3. A system for recording and reproducing information according to claim 2, wherein contact pressure between said head and said medium is less than 10 gr.

* * * * *

UNITED STATES PATENT AND TRADEMARK OFFICE
CERTIFICATE OF CORRECTION

PATENT NO. : 4,803,577
DATED : February 7, 1989
INVENTOR(S) : Ezaki et al.

It is certified that error appears in the above—identified patent and that said Letters Patent is hereby corrected as shown below:

Front sheet, in the heading change

"Date of Patent: February 7, 1988" to

--Date of Patent: February 7, 1989--

Signed and Sealed this

First Day of August, 1989

Attest:

DONALD J. QUIGG

Attesting Officer

Commissioner of Patents and Trademarks